US012652133B2

(12) United States Patent
Hong et al.

(10) Patent No.: US 12,652,133 B2
(45) Date of Patent: Jun. 9, 2026

(54) CONFIGURATION METHOD AND APPARATUS FOR CONTROL CHANNEL, AND COMMUNICATIONS DEVICE

(71) Applicant: VIVO MOBILE COMMUNICATION CO., LTD., Dongguan (CN)

(72) Inventors: Qi Hong, Dongguan (CN); Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 381 days.

(21) Appl. No.: 18/203,047

(22) Filed: May 29, 2023

(65) Prior Publication Data

US 2023/0308222 A1      Sep. 28, 2023

Related U.S. Application Data

(63) Continuation of application No. PCT/CN2021/142837, filed on Dec. 30, 2021.

(30) Foreign Application Priority Data

Dec. 31, 2020    (CN) .......................... 202011640620.3

(51) Int. Cl.
| | |
|---|---|
| *H04L 5/00* | (2006.01) |
| *H04L 1/1822* | (2023.01) |
| *H04L 1/1829* | (2023.01) |
| *H04W 72/20* | (2023.01) |
| *H04L 1/1812* | (2023.01) |

(52) U.S. Cl.
CPC .......... *H04L 1/1822* (2013.01); *H04L 5/0053* (2013.01); *H04W 72/20* (2023.01); *H04L 1/1812* (2013.01)

(58) Field of Classification Search
CPC ... H04L 1/1822; H04L 1/1812; H04L 1/1896; H04L 5/0055; H04L 5/0053; H04W 72/20
See application file for complete search history.

(56) References Cited

U.S. PATENT DOCUMENTS

| | | | | |
|---|---|---|---|---|
| 2020/0213046 A1* | 7/2020 | Wang | .................... | H04L 1/1819 |
| 2020/0313807 A1* | 10/2020 | Salem | ................... | H04L 1/1607 |

(Continued)

FOREIGN PATENT DOCUMENTS

| | | |
|---|---|---|
| CN | 107231218 A | 10/2017 |
| CN | 108633038 A | 10/2018 |

(Continued)

OTHER PUBLICATIONS

3GPP TSG RAN WG1 Meeting#90, R1-1712182 Title:Configuration of control resource set (Year: 2017).*

(Continued)

*Primary Examiner* — Faruk Hamza
*Assistant Examiner* — Abusayeed M Haque
(74) *Attorney, Agent, or Firm* — IPX PLLC

(57) ABSTRACT

A configuration method and apparatus for a control channel, and a communications device are provided. When a first control channel schedules a plurality of data channels, the method includes: establishing a second control channel; and performing hybrid automatic repeat request acknowledgement codebook processing on at least one of the data channels based on the second control channel.

20 Claims, 5 Drawing Sheets

S301

Establish one corresponding second control channel for each of the data channels in a case that a first control channel schedules a plurality of data channels

S302

Perform hybrid automatic repeat request acknowledgement codebook processing on at least one of the data channels based on the second control channel

(56)                    References Cited

U.S. PATENT DOCUMENTS

| | | | | |
|---|---|---|---|---|
| 2022/0173867 | A1* | 6/2022 | Nogami | H04L 5/0053 |
| 2022/0256538 | A1* | 8/2022 | Yeo | H04L 5/00 |

FOREIGN PATENT DOCUMENTS

| | | | | |
|---|---|---|---|---|
| CN | 109155694 | A | 1/2019 | |
| CN | 109155703 | A | 1/2019 | |
| CN | 110943805 | A | 3/2020 | |
| CN | 110943815 | A | 3/2020 | |
| CN | 111385080 | A | 7/2020 | |
| CN | 111954307 | A | 11/2020 | |
| CN | 111989885 | A | 11/2020 | |
| KR | 20200035790 | A | 4/2020 | |
| WO | WO-2019216620 | A1 * | 11/2019 | H04W 72/21 |
| WO | 2020235884 | A1 | 11/2020 | |

OTHER PUBLICATIONS

3GPP TSG RAN WG1 Meeting#108-e, R1-2202117 Title:Clearification on TPC Command Handling (Year: 2022).*

Extended European Search Report issued in related European Application No. 21914593.5, mailed Jun. 4, 2024, 7 pages.
VIVO:"Discussions on POSCH PUSCH enhancements for NR operation from 52.6GHz to 71GHz", 3GPP Draft; R1-2100433, Jan. 2021, 9 pages.
Ericsson:"On NR operations in 52.6 to 71 GHz", 3GPP Draft; R1-2007982, Nov. 2020, 60 pages.
First Office Action issued in related Chinese Application No. 202011640620.3, mailed Oct. 12, 2023, 8 pages.
Spreadtrum Communications, "Discussion on multi-cell PDSCH scheduling via a single DCI", 3GPP tsg_ran\wg1_rl1, tsgr1_103-e, R1-2008111.
Liu Qiuyan et al., "Joint Control Channel and Service Channel Allocation Strategy in LTE Network", Acta Scientiarum Naturalium Universitatis Pekinensis, vol. 51, No. 3, May 2015, 7 pages.
Second Office Action issued in related Chinese Application No. 202011640620.3, mailed Mar. 29, 2024, 7 pages.
Supplemental Search Report issued in related Chinese Application No. 202011640620.3, mailed Jun. 3, 2020, 2 pages.
International Search Report issued in corresponding International Application No. PCT/CN2021/142837, mailed Mar. 22, 2022, 6 pages.
Ericsson, Overview of DL Control Channel Design, 3GPP TSG-RAN WG1 Meeting#89, R1-1709062, May 15-19, 2017, 10 pages.

* cited by examiner

12

Network side device 11    11

Terminal

Terminal

S201

Establish a second control channel in a case that a first control channel schedules a plurality of data channels

S202

Perform hybrid automatic repeat request acknowledgement codebook processing on at least one of the data channels based on the second control channel

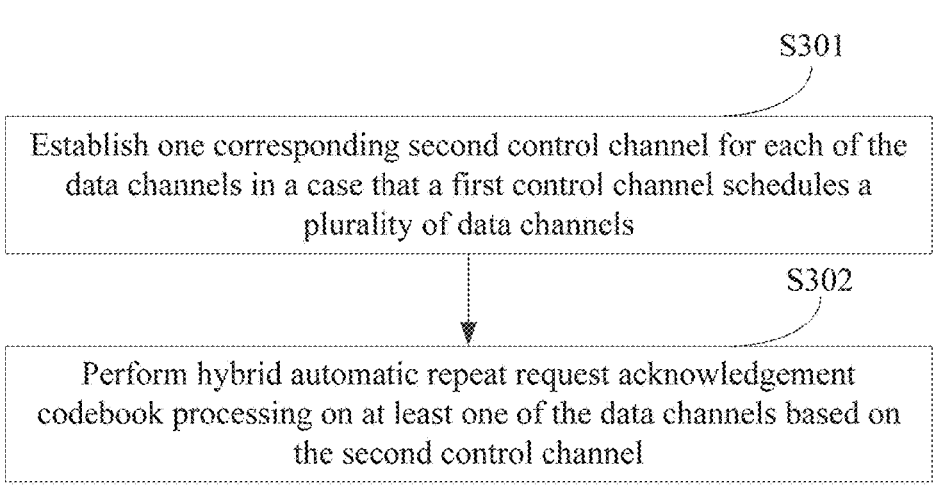
FIG. 3
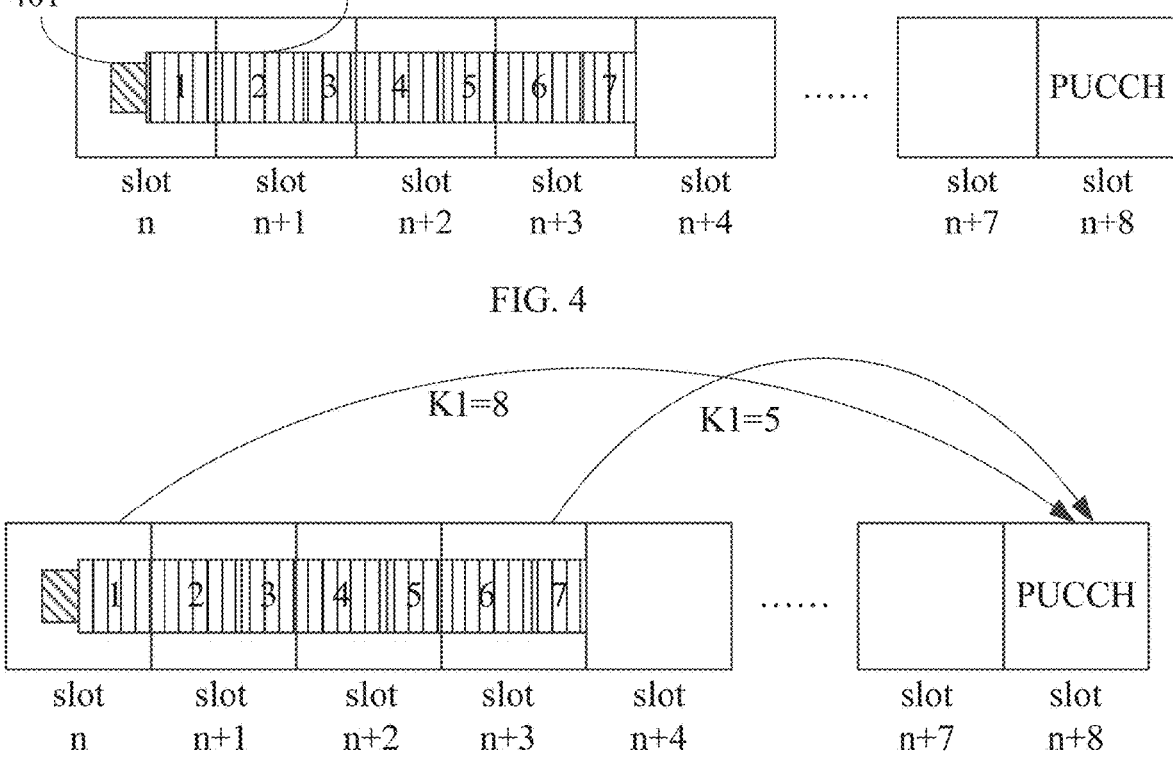
FIG. 4
FIG. 5

CONFIGURATION METHOD AND APPARATUS FOR CONTROL CHANNEL, AND COMMUNICATIONS DEVICE

CROSS-REFERENCE TO RELATED APPLICATIONS

This application is a continuation of International Application No. PCT/CN2021/142837, filed Dec. 30, 2021, which claims priority to Chinese Patent Application No. 202011640620.3, filed Dec. 31, 2021. The entire contents of each of the above-referenced applications are expressly incorporated herein by reference.

TECHNICAL FIELD

This application pertains to the field of mobile communications technologies, and in particular, to a configuration method and apparatus for a control channel, a terminal, and a network side device.

BACKGROUND

A large Subcarrier Spacing (SCS) is introduced into the 5G system, for example, SCS=480K/960K. Therefore, the number of slots included in a subframe may increase, and a time occupied by each slot is very small. As a result, a plurality of data channels may be scheduled through a control channel, for example, a Physical Downlink Control Channel (PDCCH) is used to schedule a plurality of Physical Downlink Shared Channel (PDSCH).

However, if one PDCCH is used to schedule a plurality of PDSCHs, the communications device cannot perform subsequent processing and feedback procedures, as well as generation of a hybrid automatic repeat request acknowledgement (HARQ-ACK) codebook, and the like.

SUMMARY

Embodiments of this application are intended to provide a configuration method and apparatus for a control channel, and a communications device, which can enable the communications device to perform subsequent processing and feedback procedures when a control channel schedules a plurality of data channels.

According to a first aspect, a configuration method for a control channel is provided, where the method is performed by a communications device and includes:

establishing a second control channel in a case that a first control channel schedules a plurality of data channels; and performing hybrid automatic repeat request acknowledgement codebook processing on at least one of the data channels based on the second control channel.

According to a second aspect, a configuration apparatus for a control channel is provided, including.

an establishing module, configured to establish a second control channel in a case that a first control channel schedules a plurality of data channels; and a processing module, configured to perform hybrid automatic repeat request acknowledgement codebook processing on at least one of the data channels based on the second control channel.

According to a third aspect, a terminal is provided, where the terminal includes a processor, a memory, and a program or an instruction stored in the memory and executable on the processor, and when the program or the instruction is executed by the processor, steps of the method according to the first aspect are implemented.

According to a fourth aspect, a network side device is provided, where the network side device includes a processor, a memory, and a program or an instruction stored in the memory and executable on the processor, and when the program or the instruction is executed by the processor, steps of the method according to the first aspect are implemented.

According to a fifth aspect, a readable storage medium is provided, where the readable storage medium stores a program or an instruction, and when the program or the instruction is executed by a processor, steps of the method according to the first aspect are implemented.

According to a sixth aspect, a chip is provided, where the chip includes a processor and a communications interface, the communications interface is coupled to the processor, and the processor is configured to run a program or an instruction of a network side device, to implement the method according to the first aspect.

In the embodiments of this application, the second control channel is established in a case that the plurality of data channels are scheduled by the first control channel; and the hybrid automatic repeat request acknowledgement codebook processing is performed on at least one of the data channels based on the second control channel, so that the communications device can perform subsequent processing and feedback procedures when a control channel schedules a plurality of data channels.

BRIEF DESCRIPTION OF DRAWINGS

FIG. 3 is another schematic flowchart of a configuration method for a control channel according to an embodiment of this application;

FIG. 4 is a schematic diagram of a type of channel scheduling of a configuration method for a control channel according to an embodiment of this application;

FIG. 5 is a schematic diagram of another type of channel scheduling of a configuration method for a control channel according to an embodiment of this application;

DETAILED DESCRIPTION

The following clearly describes the technical solutions in the embodiments of this application with reference to the accompanying drawings in the embodiments of this application. Apparently, the described embodiments are some but not all of the embodiments of this application. Based on the embodiments of this application, all other embodiments obtained by a person of ordinary skill in the art without creative efforts shall fall within the protection scope of this application.

Terms "first" and "second" in the specification and claims of this application are used to distinguish between similar objects, and do not need to be used to describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and the character "/" generally represents an "or" relationship between associated objects.

It should be noted that the technologies described in the embodiments of this application are not limited to Long Term Evolution (LTE)/LTE-Advanced (LTE-A) systems, and may also be used in various wireless communications systems, such Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" in the embodiments of this application may be used interchangeably. The described technologies can be applied to both the systems and the radio technologies mentioned above as well as to other systems and radio technologies. However, a New Radio (NR) system is described below as an example, and the term NR is used in most of the descriptions, although these technologies can also be used in an application other than an application of the NR system, for example, a $6^{th}$ Generation (6G) communications system.

Figures 1, 2:
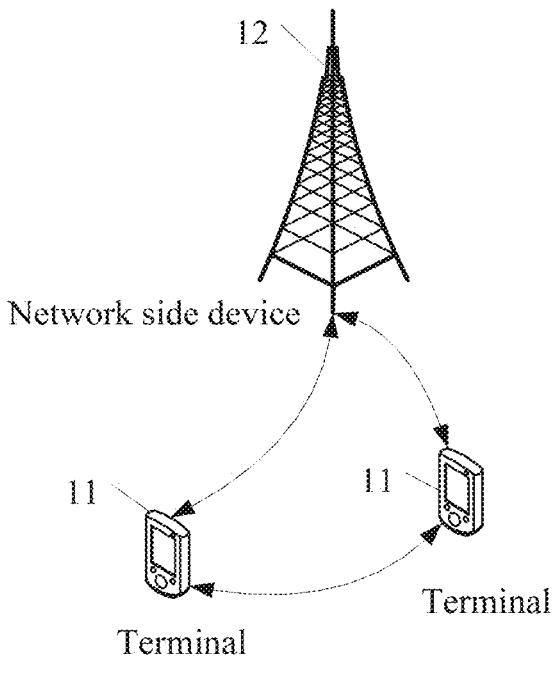
FIG. 1 is a schematic structural diagram of a wireless communications system to which an embodiment of this application can be applied.
FIG. 2 is a schematic flowchart of a configuration method for a control channel according to an embodiment of this application.

FIG. 1 is a schematic structural diagram of a wireless communications system to which an embodiment of this application can be applied. The wireless communications system includes a terminal 11 and a network side device 12. The terminal 11 may also be referred to as a terminal device or User Equipment (UE). The terminal 11 may be a terminal side device such as a mobile phone, a tablet personal computer, a laptop computer or a notebook computer, a Personal Digital Assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a WiFi node, a Transmitting Receiving Point (TRP), or another appropriate term in the art. As long as a same technical effect is achieved, the base station is not limited to a specified technical term. It should be noted that the base station in the NR system is taken only as an example in the embodiments of this application, but a specific type of the base station is not limited.

With reference to the accompanying drawings, the configuration method for a control channel provided in embodiments of this application is described in detail below by using specific embodiments and application scenarios thereof.

FIG. 2 is a schematic flowchart of a configuration method for a control channel according to an embodiment of this application. The method may be performed by a communications device, and the communications device may include a terminal or a base station. In other words, the method may be performed by software or hardware installed on the terminal or the base station. As shown in FIG. 2, the method may include the following steps.

Step S201. Establish a second control channel in a case that a first control channel schedules a plurality of data channels.

The communications device establishes a second control channel for a plurality of data channels scheduled by the first control channel, and the second control channel is a virtual control channel.

It should be understood that the first control channel and the data channel scheduled by the first control channel can be respectively a physical downlink control channel (PDCCH) and a physical downlink shared channel (PDSCH) scheduled by the physical downlink control channel, or a physical uplink control channel (PUCCH) and a physical uplink shared channel (PUSCH) scheduled by the physical uplink control channel.

Step S202. Perform hybrid automatic repeat request acknowledgement codebook processing on at least one of the data channels based on the second control channel.

HARQ-ACK codebook processing is separately performed on each data channel based on the second control channel corresponding to each data channel. The communications device uses a virtual control channel corresponding to each data channel to simplify codebook processing on the data channel.

In the embodiments of this application, the second control channel is established in a case that the plurality of data channels are scheduled by the first control channel; and the hybrid automatic repeat request acknowledgement codebook processing is performed on at least one of the data channels based on the second control channel, so that the communications device can perform subsequent processing and feedback procedures when a PDCCH schedules a plurality of PDSCHs.

FIG. 3 is another schematic flowchart of a configuration method for a control channel according to an embodiment of this application. The method may be performed by a communications device, and the communications device may include a terminal or a base station. In other words, the method may be performed by software or hardware installed on the terminal or the base station. As shown in FIG. 3, the method may include the following steps.

Step S301. Establish one corresponding second control channel for each of the data channels in a case that a first control channel schedules a plurality of data channels.

The communications device establishes a second control channel for a plurality of data channels scheduled by the first control channel, and the second control channel is a corresponding virtual control channel established for the plurality of data channels scheduled by the first control channel, that is, each data channel is corresponding to a virtual control channel.

In an implementation, the second control channel includes two parts:

a first part corresponding to a first data channel and a second part corresponding to another data channel, where the first data channel is one or more of the plurality of data channels scheduled by the first control channel; and the another data channel is a data channel other than the first data channel among the plurality of data channels scheduled by the first control channel.

The first part is a virtual control channel established for an $N^{th}$ data channel scheduled by the first control channel. The $N^{th}$ data channel may be a $1^{st}$ data channel scheduled by the first control channel.

In an implementation, the first part is the first control channel, or a control channel other than a relevant indication field of the another data channel in the first control channel.

It should be understood that the first part may be a control channel other than a part indicating a related indication field of remaining data channels on the basis of the first control channel, and the related indication field may include TDRA, and the like. The first part may also include the part indicating a related indication field of remaining data channels, and then the first part is the first control channel.

The second part is a remaining part other than the first part in the establishment plurality of second control channels.

A time domain location of the second control channel is established according to at least one of a first rule.

In an implementation, the first rule is being the same as a time domain location of the first control channel. The time domain location of the first part and the time domain location of the second part in the second control channel are respectively the same as the time domain location of the first control channel.

In another implementation, the first rule is a rule determined based on the time domain location of the first control channel and a predefined time domain rule. The time domain location of the first part and the time domain location of the second part in the second control channel are obtained based on the time domain location of the first control channel and the predefined time domain rule, and may be time domain locations with equal intervals with the time domain location of the first control channel. The interval can be predefined or preconfigured and can be set to 0.

In another implementation, the first rule is being a time domain location related to a time domain location of a data channel corresponding to the second control channel. The time domain location of the first part and the time domain location of the second part in the second control channel are time domain locations related to a time domain location of a corresponding data channel.

In an implementation, the time domain location of the second control channel is first L symbols of the time domain location of the data channel corresponding to the second control channel, where L is a time domain symbol length of the first control channel.

In another implementation, the time domain location of the second control channel is L symbols before a first symbol of the time domain location of the data channel corresponding to the second control channel, where L is a time domain symbol length of the first control channel.

In another implementation, the time domain location of the second control channel is first L symbols of a slot in which the data channel corresponding to the second control channel is located, where L is a time domain symbol length of the first control channel.

In another implementation, the time domain location of the second control channel is: in a case that there are M data channels scheduled by the first control channel in a slot in which the data channel corresponding to the second control channel is located, a time domain location that is determined based on a sequence m of the data channel corresponding to the second control channel in the M data channels and a time domain symbol length L of the first control channel, for example, the (m*L, m*L+1, . . . , m*L+L−1) symbol in the slot.

A control resource set (CORESET) of the second control channel is established according to at least one of a second rule.

In an implementation, the second rule is being the same as a control resource set of the first control channel. The configuration of CORESET of the second control channel is consistent with that of CORESET of the first control channel. The CORESET includes at least one of the following: a Resource Element Group bundle (REG bundle), an aggregation level, a Control Channel Element-Resource Element Group-mapping (CCE-REG-mapping), a precoder granularity, or the like.

In another implementation, the second rule is a predefined or preconfigured fixed value. The configuration of the CORESET of the second control channel can be set to a fixed value, that is, REG bundle, Aggregation Level, CCE-REG-mapping, Precoder granularity, and the like can be set to a fixed value respectively, and the fixed value can be predefined by the protocol or preconfigured by the base station.

In another implementation, the second rule is a rule determined based on an index value of the data channel corresponding to the second control channel and a fifth rule. The configuration of the CORESET of the second control channel, that is, REG bundle, Aggregation Level, CCE-REG-mapping, Precoder granularity, and the like, can be obtained according to the fifth rule with the change of an index value of each data channel scheduled by the first control channel. The fifth rule can be predefined by the protocol or configured by the base station.

In an implementation, the fifth rule includes: with the increase of the index value of the data channel, sequentially increasing an aggregation level and duration from initial values to the highest aggregation level and the highest number of persistent symbols 3 respectively, and then cycling this process, that is, returning to corresponding lowest values and then increasing with the increase of the index value.

A frequency domain location of the second control channel is established according to at least one of a third rule.

In an implementation, the third rule is being the same as a frequency domain location of the first control channel. Both the frequency domain location of the first part and the frequency domain location of the second part of the second control channel are the same as the frequency domain location of the first control channel.

In another implementation, the third rule is having an offset from a frequency domain location of the first control channel. The frequency domain location of the first part and the frequency domain location of the second part of the second control channel have a specific offset from a frequency domain location of the first control channel. The offset may be predefined or preconfigured. The offset may further be related to an index value of the data channel corresponding to the second control channel.

A search space of the second control channel is established according to at least one of a fourth rule.

In an implementation, the fourth rule is being the same as a search space of the first control channel. A configuration of the search space of the second control channel is exactly consistent with that of the first control channel, and the configuration of the search space includes: monitoringSlotPeriodcityAndOffset, duration, monitoringSymbolsWithinSlot, and the like.

In another implementation, the fourth rule is a predefined or preconfigured fixed value. The configuration of the search space of the second control channel, namely, monitoringSlotPeriodcityAndOffset, duration, monitoringSymbolsWithinSlot, and the like can be set to a fixed value separately. The fixed value can be predefined by the protocol or preconfigured by the base station.

In another implementation, the fourth rule is being related to a data channel corresponding to the second control channel. The configuration of the search space of the second control channel, namely, monitoringSlotPeriodcityAndOffset, duration, monitoringSymbolsWithinSlot, and the like can change, according to a specific rule, with index values of a plurality of PDSCHs scheduled by the first control channel. The specific rule can be predefined by the protocol or preconfigured by the base station.

In an implementation, for each data channel, a starting symbol location of a target parameter is at least one of the following starting locations. The target parameter includes: monitoringSymbolsWithinSlot.

The starting location may be a fixed location in a slot in which the data channel corresponding to the second control channel is located, and may be any location in 0-13 symbols.

The starting location may be a fixed location within a symbol in which the data channel corresponding to the second control channel is located. For example, if the data channel corresponding to the second control channel occupies 5-10 symbols within the slot, a starting symbol of the target parameter is any location within the 5-10 symbols.

The starting location may increase with the increase of an index value of the data channel corresponding to the second control channel until a maximum value, and this process is cycled, for example, starting from 0 to a maximum value of 13, and then this process is cycled.

An indication field carried in the second control channel can be set according to a specific rule based on an indication field carried in the first control channel.

In an implementation, the indication field carried in the second control channel is exactly consistent with the indication field carried in the first control channel.

In another implementation, a part of the indication field carried in the second control channel can change according to a specific rule. The rule can be predefined by the protocol or configured by the base station.

In an implementation, in a case that the indication field includes a hybrid automatic repeat request (HARQ) timing index (K1), that an indication field carried in the second control channel is set based on an indication field carried in the first control channel includes at least one of the following cases:

an HARQ timing index of the second control channel is the same as an HARQ timing index carried in the first control channel.

The HARQ timing index of the second control channel is determined by the HARQ timing index carried in the first control channel. A first hybrid automatic repeat request timing index of the first data channel corresponding to the first part of the second control channel is the same as the hybrid automatic repeat request timing index carried in the first control channel, and a second hybrid automatic repeat request timing index of another data channel corresponding to the second part of the second control channel is determined by a first offset value and the hybrid automatic repeat request timing index carried in the first control channel. The first offset value is an offset value between a time domain location of a plurality of different data channels scheduled by the first control channel and a time domain location of the first data channel, for example, the first offset value is an offset value between a slot in which different data channels scheduled by the first control channel are located and a slot in which the first data channel corresponding to the first part of the second control channel is located. The first offset value may further be an offset value between a K0 value of different data channels scheduled by the first control channel and a K0 value of a reference data channel, where K0 is used to represent a slot offset between a data channel and a control channel that schedules the data channel. Specific examples are as follows.

The first control channel schedules 5 data channels, and K0 values of data channels are $\{0, 1, 1, 2, 3\}$ respectively, where K0 of the first data channel is 0. If K1 of the first part of the second control channel is 8, other than the first data channel, K1 of 4 data channels of the second part of the second control channel is 8−$\{1, 1, 2, 3\}$=$\{7, 7, 6, 5\}$.

In another implementation, in a case that the indication field includes a hybrid automatic repeat request (HARQ) process index, that an indication field carried in the second control channel is set based on an indication field carried in the first control channel includes at least one of the following cases:

an HARQ process index of the first data channel corresponding to the first part of the second control channel follows the HARQ process index of the first control channel, that is, the HARQ process index of the first data is the same as the HARQ process index of the first control channel; or an HARQ process index of another data channel corresponding to the second part of the second control channel is determined by index values of a plurality of data channels scheduled by the first control channel and the HARQ process index carried in the first control channel. Specific examples are as follows.

The first control channel schedules 5 data channels with corresponding index values of $\{0, 1, 2, 3, 4\}$. If the HARQ process index in the first part of the second control channel is 1, then HARQ process indexes of 4 PDSCHs in the second part of the second control channel are 1+$\{1, 2, 3, 4\}$=$\{2, 3, 4, 5\}$.

In another implementation, in a case that the indication field includes a downlink assignment index (DAI), that an indication field carried in the second control channel is set based on an indication field carried in the first control channel includes: the downlink assignment index is determined based on index values of a plurality of data channels scheduled by the first control channel and a downlink assignment index carried in the first part. Specific examples are as follows.

The first control channel schedules 5 data channels with corresponding index values of $\{0, 1, 2, 3, 4\}$. If the DAI of the first part of the second control channel is 1, then DAIs of 4 data channels in the second part of the second control channel are 1+$\{1, 2, 3, 4\}$=$\{2, 3, 4, 5\}$. If the DAI only supports 2 bits, that is, a maximum value of the DAI is 4, DAIs of 4 data channels in the second part of the second control channel are converted into $\{2, 3, 4, 1\}$. If the bit data supported by the DAI increases, the maximum value may also exceed 4.

Figure 6:
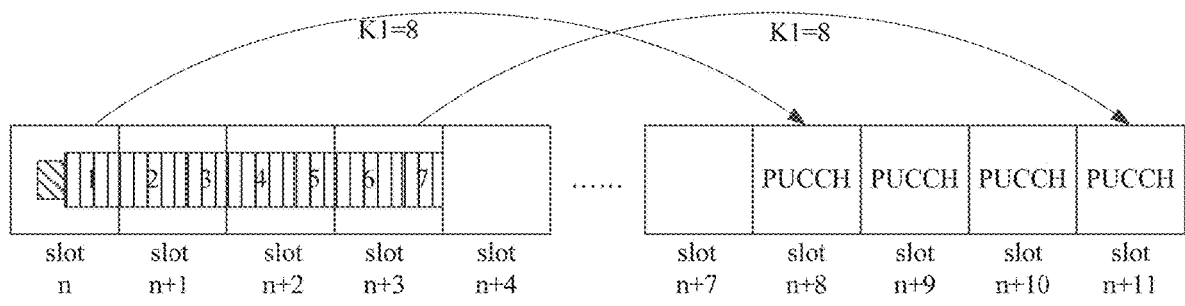
FIG. 6 is a schematic diagram of still another type of channel scheduling of a configuration method for a control channel according to an embodiment of this application.

An example is provided for description, as shown in FIG. 4 to FIG. 6.

As shown in FIG. 4, the first control channel 401 schedules seven data channels 402. Other than the first data channel, corresponding virtual control channels are set for other 6 data channels respectively. In addition, a starting location of each virtual control channel is at a starting location of a corresponding data channel, and duration in a time domain thereof is consistent with a length of the first control channel.

As shown in FIG. 5, K1 may be determined based on K0 values of different data channels 402 carried in the first control channel 401 and a K1 value carried in the first part of the second control channel. If corresponding K0 values of 7 data channels scheduled by the first control channel are respectively {0, 1, 1, 2, 2, 3, 3}, K1 of the first part of the second control channel is 8. And values of K1 of 6 data channels in the second part of the second control channel are 8−{1, 1, 2, 2, 3, 3}={7, 7, 6, 6, 5, 5}.

As shown in FIG. 6, the indication field carried in the second part of the second control channel may also be exactly consistent with the indication field carried in the first part of the second control channel. K1 of the first part of the second control channel is the same as that of the second part, and K1=8.

Step S302. Perform hybrid automatic repeat request acknowledgement codebook processing on at least one of the data channels based on the second control channel.

Step S302 performs the same step as step S202 in FIG. 2, and the same or similar effects can be achieved. For brevity, details are not described herein again.

In this embodiment of this application, one corresponding second control channel is established for each data channel through a preset rule corresponding to a related indication field of each second control channel, so that the communications device can perform subsequent processing and feedback procedures when a PDCCH schedules a plurality of PDSCHs.

It should be noted that, the configuration method for a control channel provided in the embodiments of this application may be performed by a configuration apparatus for a control channel, or a control module that is in the configuration apparatus for a control channel and that is configured to perform the configuration method for a control channel. In the embodiments of this application, an example in which the configuration apparatus for a control channel performs the configuration method for a control channel is used to describe the configuration method for a control channel provided in the embodiments of this application.

Figure 7:
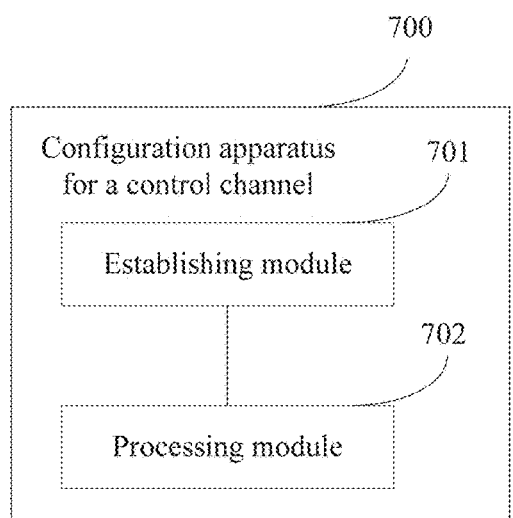
FIG. 7 is a schematic structural diagram of a configuration apparatus for a control channel according to an embodiment of this application.

FIG. 7 is a schematic structural diagram of a configuration apparatus for a control channel according to an embodiment of this application. As shown in FIG. 7, the apparatus 700 includes an establishing module 701 and a processing module 702.

The establishing module 701 is configured to establish a second control channel in a case that a first control channel schedules a plurality of data channels; and the processing module 702 is configured to perform hybrid automatic repeat request acknowledgement codebook processing on at least one of the data channels based on the second control channel.

In the embodiments of this application, the second control channel is established in a case that the plurality of data channels are scheduled by the first control channel; and the hybrid automatic repeat request acknowledgement codebook processing is performed on at least one of the data channels based on the second control channel, so that the communications device can perform subsequent processing and feedback procedures when a PDCCH schedules a plurality of PDSCHs.

Further, the establishing module is configured to establish one corresponding second control channel for each of the data channels.

Further, the second control channel includes:

a first part corresponding to a first data channel and a second part corresponding to another data channel, where the first data channel is one or more of the plurality of data channels scheduled by the first control channel; and the another data channel is a data channel other than the first data channel among the plurality of data channels scheduled by the first control channel.

Further, the first part is the first control channel, or a control channel other than a relevant indication field of the another data channel in the first control channel.

Further, a time domain location of the second control channel is established according to at least one of a first rule; and the first rule includes:

being the same as a time domain location of the first control channel;

a rule determined based on the time domain location of the first control channel and a predefined time domain rule; and being a time domain location related to a time domain location of a data channel corresponding to the second control channel.

Further, the time domain location related to a time domain location of a data channel corresponding to the second control channel includes at least one of the following:

first L symbols of the time domain location of the data channel corresponding to the second control channel, where L is a time domain symbol length of the first control channel;

L symbols before a first symbol of the time domain location of the data channel corresponding to the second control channel, where L is a time domain symbol length of the first control channel;

first L symbols of a slot in which the data channel corresponding to the second control channel is located, where L is a time domain symbol length of the first control channel; and in a case that there are M data channels scheduled by the first control channel in a slot in which the data channel corresponding to the second control channel is located, a time domain location that is determined based on a sequence m of the data channel corresponding to the second control channel in the M data channels and a time domain symbol length L of the first control channel.

Further, a control resource set of the second control channel is established according to at least one of a second rule; and the second rule includes:

being the same as a control resource set of the first control channel; a predefined or preconfigured fixed value; and a rule determined based on an index value of the data channel corresponding to the second control channel and a fifth rule.

Further, the control resource set includes at least one of the following: a resource element group bundle (REG bundle), an aggregation level, a control channel element-resource element group-mapping (CCE-REG-mapping), or a precoder granularity.

Further, the fifth rule includes:

sequentially increasing an aggregation level and duration from initial values until maximum values, and cycling this process.

Further, a frequency domain location of the second control channel is established according to at least one of a third rule; and the third rule includes:

being the same as a frequency domain location of the first control channel; and having an offset from a frequency domain location of the first control channel.

Further, the offset is predefined or preconfigured, and/or the offset is related to an index value of a data channel corresponding to the second control channel.

Further, a search space of the second control channel is established according to at least one of a fourth rule; and the fourth rule includes:

being the same as a search space of the first control channel;

a predefined or preconfigured fixed value; and being related to a data channel corresponding to the second control channel.

Further, the being related to a data channel corresponding to the second control channel includes:

for each data channel, a starting symbol location of a target parameter is at least one of the following starting locations, and the starting locations include:

a fixed location in a slot in which the data channel corresponding to the second control channel is located;

a fixed location in a symbol in which the data channel corresponding to the second control channel is located; and the starting location increasing with the increase of an index value of the data channel corresponding to the second control channel until a maximum value, and cycling this process.

Further, an indication field carried in the second control channel is set based on an indication field carried in the first control channel.

Further, in a case that the indication field includes a hybrid automatic repeat request timing index, that an indication field carried in the second control channel is set based on an indication field carried in the first control channel includes at least one of the following cases:

being the same as a hybrid automatic repeat request timing index carried in the first control channel; or a first hybrid automatic repeat request timing index of the first data channel is the same as the hybrid automatic repeat request timing index carried in the first control channel, and a second hybrid automatic repeat request timing index of another data channel is determined by a first offset value and the hybrid automatic repeat request timing index carried in the first control channel, where the first offset value is an offset value between a time domain location of a plurality of different data channels scheduled by the first control channel and a time domain location of the first data channel.

Further, in a case that the indication field includes a hybrid automatic repeat request process index, that an indication field carried in the second control channel is set based on an indication field carried in the first control channel includes at least one of the following cases:

a hybrid automatic repeat request process index of the first data channel is the same as the hybrid automatic repeat request process index of the first control channel, or a hybrid automatic repeat request process index of another data channel is determined by index values of a plurality of data channels scheduled by the first control channel and the hybrid automatic repeat request process index carried in the first control channel.

Further, in a case that the indication field includes a downlink assignment index, that an indication field carried in the second control channel is set based on an indication field carried in the first control channel includes:

the downlink assignment index is determined based on index values of a plurality of data channels scheduled by the first control channel and a downlink assignment index carried in the first part.

In this embodiment of this application, one corresponding second control channel is established for each data channel through a preset rule corresponding to a related indication field of each second control channel, so that the communications device can perform subsequent processing and feedback procedures when a PDCCH schedules a plurality of PDSCHs.

The configuration apparatus for a control channel in this embodiment of this application may be an apparatus, or may be a component, an integrated circuit, or a chip in a terminal. The apparatus may be a mobile terminal, or a non-mobile terminal. For example, the mobile terminal may include, but is not limited to, a type of the terminal 11 listed above. The non-mobile terminal may be a server, a network attached storage (NAS), a personal computer (PC), a television (TV), a teller machine, or a self-service machine. This is not specifically limited in this embodiment of this application.

The configuration apparatus for a control channel in this embodiment of this application may be an apparatus with an operating system. The operating system may be an Android operating system, may be an iOS operating system, or may be another possible operating system, which is not specifically limited in the embodiments of this application.

The configuration apparatus for a control channel provided in this embodiment of this application can implement the processes implemented in the method embodiments in FIG. 2 and FIG. 3, and a same technical effect can be achieved. To avoid repetition, details are not described herein again.

Figure 8:
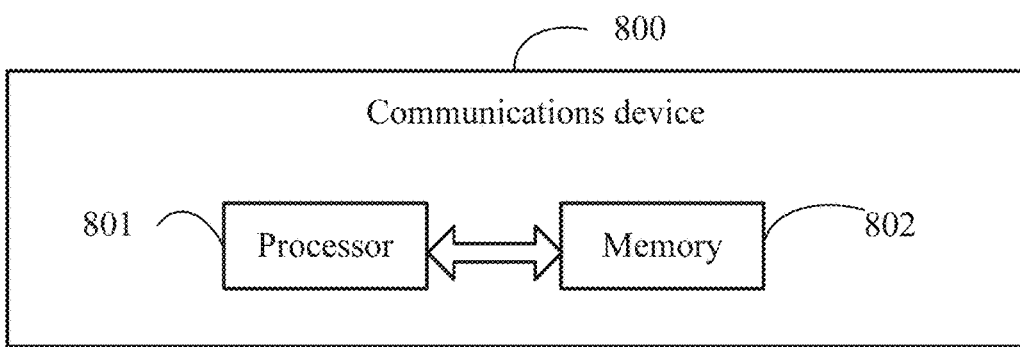
FIG. 8 is a schematic structural diagram of a communications device according to an embodiment of this application.

In some embodiments, as shown in FIG. 8, an embodiment of this application further provides a communications device 800, including a processor 801, a memory 802, and a program or an instruction stored in the memory 802 and executable on the processor 801. For example, when the communications device 800 is a terminal, the program or the instruction is executed by the processor 801 to implement the processes of the embodiment of the foregoing configuration method for a control channel, and a same technical effect can be achieved. In a case that the communications device 800 is a network side device, when the program or instruction is executed by the processor 801, the processes of the embodiment of the foregoing configuration method for a control channel are implemented, and a same technical effect can be achieved. To avoid repetition, details are not provided herein again.

Figure 9:
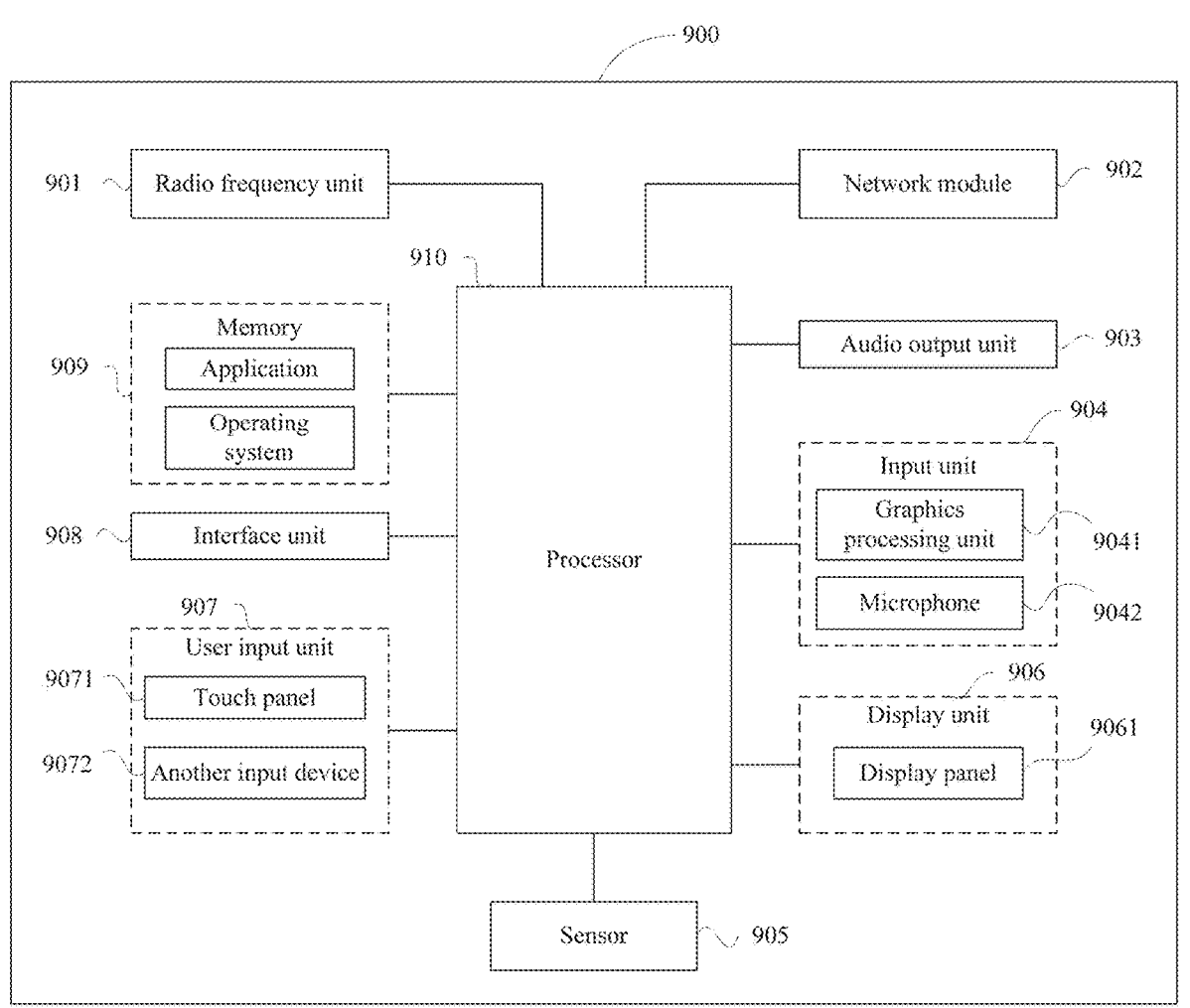
FIG. 9 is a schematic diagram of a hardware structure of a terminal according to an embodiment of this application.

FIG. 9 is a schematic diagram of a hardware structure of a terminal according to an embodiment of this application.

The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

A person skilled in the art can understand that the terminal 900 may further include a power supply (such as a battery) that supplies power to each component. The power supply may be logically connected to the processor 910 by using a power supply management system, to implement functions such as charging and discharging management, and power consumption management by using the power supply management system. The terminal structure shown in FIG. 9 constitutes no limitation on the terminal, and the terminal may include more or fewer components than those shown in the figure, or combine some components, or have different component arrangements. Details are not described herein.

It should be understood that, in this embodiment of this application, the input unit 904 may include a Graphics Processing Unit (GPU) 9041 and a microphone 9042, and the graphics processing unit 9041 processes image data of a still picture or a video obtained by an image capture apparatus (such as a camera) in a video capture mode or an image capture mode. The display unit 906 may include a display panel 9061. In some embodiments, the display panel 9061 may be configured in a form such as a liquid crystal display or an organic light-emitting diode. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but is not limited to a physical keyboard, a functional button (such as a volume control button or a power on/off button), a trackball, a mouse, and a joystick. Details are not described herein.

In this embodiment of this application, the radio frequency unit 901 receives downlink data from a network side device and then sends the downlink data to the processor 910 for processing; and sends uplink data to the network side device. Usually, the radio frequency unit 901 includes but is not limited to an antenna, at least one amplifier, a transceiver, a coupler, a low noise amplifier, a duplexer, and the like.

The memory 909 may be configured to store a software program or an instruction and various data. The memory 909 may mainly include a program or instruction storage area and a data storage area. The program or instruction storage area may store an operating system, and an application or an instruction required by at least one function (for example, a sound playing function or an image playing function). In addition, the memory 909 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 910 may include one or more processing units. In some embodiments, an application processor and a modem processor may be integrated into the processor 910. The application processor mainly processes an operating system, a user interface, an application, an instruction, or the like. The modem processor mainly processes wireless communications, for example, a baseband processor. It can be understood that the modem processor may not be integrated into the processor 910.

The processor 910 is configured to: establish a second control channel in a case that a first control channel schedules a plurality of data channels; and perform hybrid automatic repeat request acknowledgement codebook processing on at least one of the data channels based on the second control channel.

In the embodiments of this application, the second control channel is established in a case that the plurality of data channels are scheduled by the first control channel; and the hybrid automatic repeat request acknowledgement codebook processing is performed on at least one of the data channels based on the second control channel, so that the communications device can perform subsequent processing and feedback procedures when a PDCCH schedules a plurality of PDSCHs.

In some embodiments, the processor 910 is further configured to establish one corresponding second control channel for each of the data channels.

In some embodiments, the second control channel includes:

a first part corresponding to a first data channel and a second part corresponding to another data channel, where the first data channel is one or more of the plurality of data channels scheduled by the first control channel; and the another data channel is a data channel other than the first data channel among the plurality of data channels scheduled by the first control channel.

In some embodiments, the first part is the first control channel, or a control channel other than a relevant indication field of the another data channel in the first control channel.

In some embodiments, a time domain location of the second control channel is established according to at least one of a first rule; and the first rule includes:

being the same as a time domain location of the first control channel;

a rule determined based on the time domain location of the first control channel and a predefined time domain rule; and being a time domain location related to a time domain location of a data channel corresponding to the second control channel.

In some embodiments, the time domain location related to a time domain location of a data channel corresponding to the second control channel includes at least one of the following:

first L symbols of the time domain location of the data channel corresponding to the second control channel, where L is a time domain symbol length of the first control channel;

L symbols before a first symbol of the time domain location of the data channel corresponding to the second control channel, where L is a time domain symbol length of the first control channel;

first L symbols of a slot in which the data channel corresponding to the second control channel is located, where L is a time domain symbol length of the first control channel; or in a case that there are M data channels scheduled by the first control channel in a slot in which the data channel corresponding to the second control channel is located, a time domain location that is determined based on a sequence m of the data channel corresponding to the second control channel in the M data channels and a time domain symbol length L of the first control channel.

In some embodiments, a control resource set of the second control channel is established according to at least one of a second rule; and the second rule includes:

being the same as a control resource set of the first control channel;

a predefined or preconfigured fixed value; and a rule determined based on an index value of the data channel corresponding to the second control channel and a fifth rule.

In some embodiments, the control resource set includes at least one of the following: a resource element group bundle (REG bundle), an aggregation level, a control channel element-resource element group-mapping (CCE-REG-mapping), or a precoder granularity.

In some embodiments, the fifth rule includes:

sequentially increasing an aggregation level and duration from initial values until maximum values, and cycling this process.

In some embodiments, a frequency domain location of the second control channel is established according to at least one of a third rule; and the third rule includes:

being the same as a frequency domain location of the first control channel; and having an offset from a frequency domain location of the first control channel.

In some embodiments, the offset is predefined or preconfigured, and/or the offset is related to an index value of a data channel corresponding to the second control channel.

In some embodiments, a search space of the second control channel is established according to at least one of a fourth rule; and the fourth rule includes:

being the same as a search space of the first control channel;

a predefined or preconfigured fixed value; and being related to a data channel corresponding to the second control channel.

In some embodiments, the being related to a data channel corresponding to the second control channel includes:

for each data channel, a starting symbol location of a target parameter is at least one of the following starting locations, and the starting locations include:

a fixed location in a slot in which the data channel corresponding to the second control channel is located;

a fixed location in a symbol in which the data channel corresponding to the second control channel is located; and the starting location increasing with the increase of an index value of the data channel corresponding to the second control channel until a maximum value, and cycling this process.

In some embodiments, an indication field carried in the second control channel is set based on an indication field carried in the first control channel.

In some embodiments, in a case that the indication field includes a hybrid automatic repeat request timing index, that an indication field carried in the second control channel is set based on an indication field carried in the first control channel includes at least one of the following cases:

being the same as a hybrid automatic repeat request timing index carried in the first control channel; or a first hybrid automatic repeat request timing index of the first data channel is the same as the hybrid automatic repeat request timing index carried in the first control channel, and a second hybrid automatic repeat request timing index of another data channel is determined by a first offset value and the hybrid automatic repeat request timing index carried in the first control channel, where the first offset value is an offset value between a time domain location of a plurality of different data channels scheduled by the first control channel and a time domain location of the first data channel.

In some embodiments, in a case that the indication field includes a hybrid automatic repeat request process index, that an indication field carried in the second control channel is set based on an indication field carried in the first control channel includes at least one of the following cases:

a hybrid automatic repeat request process index of the first data channel is the same as the hybrid automatic repeat request process index of the first control channel, or a hybrid automatic repeat request process index of another data channel is determined by index values of a plurality of data channels scheduled by the first control channel and the hybrid automatic repeat request process index carried in the first control channel.

In some embodiments, in a case that the indication field includes a downlink assignment index, that an indication field carried in the second control channel is set based on an indication field carried in the first control channel includes:

the downlink assignment index is determined based on index values of a plurality of data channels scheduled by the first control channel and a downlink assignment index carried in the first part.

In this embodiment of this application, one corresponding second control channel is established for each data channel through a preset rule corresponding to a related indication field of each second control channel, so that the communications device can perform subsequent processing and feedback procedures when a PDCCH schedules a plurality of PDSCHs.

Figure 10:
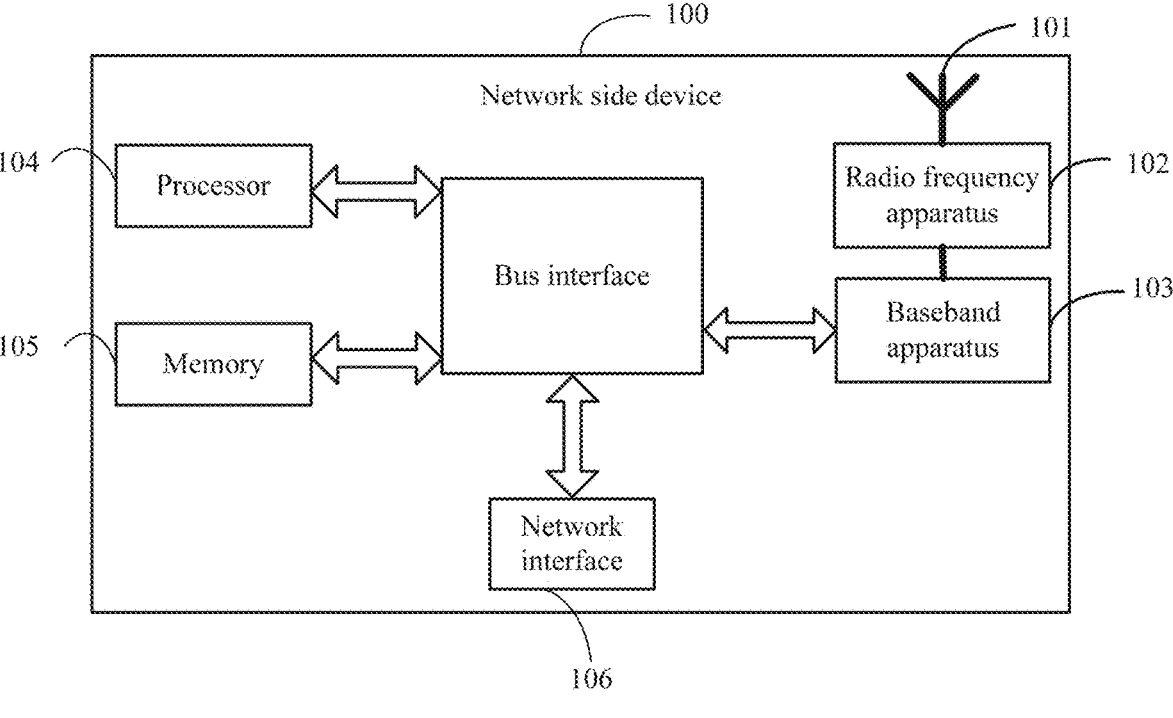
FIG. 10 is a schematic structural diagram of a network device according to an embodiment of this application.

Some embodiments of this application further provide a network side device. As shown in FIG. 10, a network device 1000 includes an antenna 101, a radio frequency apparatus 102, and a baseband apparatus 103. The antenna 101 is connected to the radio frequency apparatus 102. In an uplink direction, the radio frequency apparatus 102 receives information by using the antenna 101, and sends the received information to the baseband apparatus 103 for processing. In a downlink direction, the baseband apparatus 103 processes information that needs to be sent, and sends processed information to the radio frequency apparatus 102. The radio frequency apparatus 102 processes the received information, and sends processed information by using the antenna 101.

The frequency band processing apparatus may be located in the baseband apparatus 103. The method performed by the network side device in the foregoing embodiment may be implemented in the baseband apparatus 103. The baseband apparatus 103 includes a processor 104 and a memory 105.

The baseband apparatus 103 may include, for example, at least one baseband board, where a plurality of chips are disposed on the baseband board. As shown in FIG. 10, one chip is, for example, the processor 104, which is connected to the memory 105, so as to invoke a program in the memory 105 to perform operations of the network device shown in the foregoing method embodiment.

The baseband apparatus 103 may further include a network interface 106, configured to exchange information with the radio frequency apparatus 102, where the interface is, for example, a common public radio interface (CPRI).

The network side device in this embodiment of this application further includes an instruction or a program that is stored in the memory 105 and that can be run on the processor 104. The processor 104 invokes the instruction or the program in the memory 105 to perform the method performed by the modules shown in FIG. 7, and a same technical effect is achieved. To avoid repetition, details are not described herein again.

An embodiment of this application further provides a readable storage medium. The readable storage medium stores a program or an instruction, and when the program or the instruction is executed by a processor, the processes of the embodiment of the foregoing configuration method for a control channel are implemented, and a same technical effect can be achieved. To avoid repetition, details are not described herein again.

The processor is a processor in the terminal in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communications interface, the communications interfaces is coupled to the processor, and the processor is configured to run a program or an instruction of a network side device to implement the processes of the embodiment of the foregoing configuration method for a control channel, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. A configuration method for a control channel, performed by a communications device, comprising:
    when a first control channel schedules a plurality of data channels, establishing a second control channel; and
    performing a hybrid automatic repeat request acknowledgement codebook processing on the at least one of the data channels based on the second control channel,
    wherein the second control channel corresponds to the at least one of the data channels, and the second control channel is a virtual channel configured to perform the hybrid automatic repeat request acknowledgement codebook processing on the at least one of the data channels.

2. The configuration method according to claim 1, wherein establishing the second control channel comprises:
    establishing one corresponding second control channel for each of the data channels.

3. The configuration method according to claim 1, wherein the second control channel comprises:
    a first part corresponding to a first data channel and a second part corresponding to another data channel,
    wherein the first data channel is one or more of the plurality of data channels scheduled by the first control channel; and the another data channel is a data channel other than the first data channel among the plurality of data channels scheduled by the first control channel.

4. The configuration method according to claim 3, wherein the first part is the first control channel, or a control channel other than a relevant indication field of the another data channel in the first control channel.

5. The configuration method according to claim 3, wherein a time domain location of the second control channel is established according to a first rule comprising at least one of the following:
    being the same as a time domain location of the first control channel;
    a rule determined based on the time domain location of the first control channel and a predefined time domain rule; or
    being a time domain location related to a time domain location of a data channel corresponding to the second control channel.

6. The configuration method according to claim 5, wherein the time domain location related to the time domain location of the data channel corresponding to the second control channel comprises at least one of the following:
    first L symbols of the time domain location of the data channel corresponding to the second control channel, wherein L is a time domain symbol length of the first control channel;
    L symbols before a first symbol of the time domain location of the data channel corresponding to the second control channel, wherein L is a time domain symbol length of the first control channel;
    first L symbols of a slot in which the data channel corresponding to the second control channel is located, wherein L is a time domain symbol length of the first control channel; or
    when there are M data channels scheduled by the first control channel in a slot in which the data channel corresponding to the second control channel is located, a time domain location that is determined based on a sequence m of the data channel corresponding to the second control channel in the M data channels and a time domain symbol length L of the first control channel.

7. The configuration method according to claim 1, wherein a control resource set of the second control channel is established according to a second rule comprising at least one of the following:

being the same as a control resource set of the first control channel;

a predefined or preconfigured fixed value; or a rule determined based on an index value of the data channel corresponding to the second control channel and a fifth rule.

8. The configuration method according to claim 7, wherein the control resource set comprises at least one of the following: a resource element group bundle (REG bundle), an aggregation level, a control channel element-resource element group-mapping (CCE-REG-mapping), or a precoder granularity.

9. The configuration method according to claim 7, wherein the fifth rule comprises:

sequentially increasing an aggregation level and duration from initial values until maximum values, and cycling this process.

10. The configuration method according to claim 1, wherein a frequency domain location of the second control channel is established according to a third rule comprising at least one of the following:

being the same as a frequency domain location of the first control channel; or having an offset from a frequency domain location of the first control channel.

11. The configuration method according to claim 10, wherein the offset is predefined or preconfigured, or the offset is related to an index value of a data channel corresponding to the second control channel.

12. The configuration method according to claim 1, wherein a search space of the second control channel is established according to a fourth rule comprising at least one of the following:

being the same as a search space of the first control channel;

a predefined or preconfigured fixed value; or being related to a data channel corresponding to the second control channel.

13. The method according to claim 12, wherein being related to the data channel corresponding to the second control channel comprises:

for each data channel, a starting symbol location of a target parameter is at least one of the following starting locations, and the starting locations comprise:

a fixed location in a slot in which the data channel corresponding to the second control channel is located;

a fixed location in a symbol in which the data channel corresponding to the second control channel is located; and the starting location increasing with the increase of an index value of the data channel corresponding to the second control channel until a maximum value, and cycling this process.

14. The method according to claim 3, wherein an indication field carried in the second control channel is set based on an indication field carried in the first control channel.

15. The method according to claim 14, wherein when the indication field comprises a hybrid automatic repeat request timing index, that the indication field carried in the second control channel is set based on the indication field carried in the first control channel comprises at least one of the following cases:

being the same as a hybrid automatic repeat request timing index carried in the first control channel; or a first hybrid automatic repeat request timing index of the first data channel is the same as the hybrid automatic repeat request timing index carried in the first control channel, and a second hybrid automatic repeat request timing index of another data channel is determined by a first offset value and the hybrid automatic repeat request timing index carried in the first control channel, wherein the first offset value is an offset value between a time domain location of a plurality of different data channels scheduled by the first control channel and a time domain location of the first data channel.

16. The method according to claim 15, wherein when the indication field comprises the hybrid automatic repeat request process index, that the indication field carried in the second control channel is set based on the indication field carried in the first control channel comprises at least one of the following cases:

a hybrid automatic repeat request process index of the first data channel is the same as the hybrid automatic repeat request process index of the first control channel, or a hybrid automatic repeat request process index of another data channel is determined by index values of a plurality of data channels scheduled by the first control channel and the hybrid automatic repeat request process index carried in the first control channel.

17. The method according to claim 14, wherein when the indication field comprises a downlink assignment index, that the indication field carried in the second control channel is set based on the indication field carried in the first control channel comprises:

the downlink assignment index is determined based on index values of a plurality of data channels scheduled by the first control channel and a downlink assignment index carried in the first part.

18. A terminal, comprising:

a memory storing a computer program; and a processor coupled to the memory and configured to execute the computer program to perform operations comprising:

when a first control channel schedules a plurality of data channels, establishing a second control channel; and performing hybrid automatic repeat request acknowledgement codebook processing on at least one of the data channels based on the second control channel, wherein the second control channel corresponds to the at least one of the data channels, and the second control channel is a virtual channel configured to perform the hybrid automatic repeat request acknowledgement codebook processing on the at least one of the data channels.

19. The terminal according to claim 18, wherein establishing the second control channel comprises:

establishing one corresponding second control channel for each of the data channels.

20. A non-transitory computer-readable storage medium, storing a computer program, wherein the computer program, when executed by a processor of a terminal, causes the processor to perform operations comprising:

when a first control channel schedules a plurality of data channels, establishing a second control channel; and performing hybrid automatic repeat request acknowledge-
ment codebook processing on at least one of the data
channels based on the second control channel,
wherein the second control channel corresponds to the at
least one of the data channels, and the second control
channel is a virtual channel configured to perform the
hybrid automatic repeat request acknowledgement
codebook processing on the at least one of the data
channels.

* * * * *